US012591245B2

(12) United States Patent (10) Patent No.: US 12,591,245 B2
Tighe et al. (45) **Date of Patent: *Mar. 31, 2026**

(54) AIRCRAFT WITH PUSHER PROPELLER

(71) Applicant: Wisk Aero LLC, Mountain View, CA (US)

(72) Inventors: James Joseph Tighe, San Jose, CA (US); Uri Tzarnotzky, Sunnyvale, CA (US); Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,202

(22) Filed: Apr. 3, 2024

(65) Prior Publication Data

US 2025/0361006 A1 Nov. 27, 2025

Related U.S. Application Data

(63) Continuation of application No. 17/173,133, filed on Feb. 10, 2021, now Pat. No. 11,975,830.

(Continued)

(51) Int. Cl.
*B64C 29/00* (2006.01)
*B60L 50/50* (2019.01)
(Continued)

(52) U.S. Cl.
CPC .......... *B64C 29/0025* (2013.01); *B60L 50/50* (2019.02); *B64C 5/02* (2013.01);
(Continued)

(58) Field of Classification Search
CPC ....... B64C 29/0025; B64C 5/02; B64C 11/00; B64C 27/32; B60L 50/50; B60L 2200/10; B64D 27/24; G05D 1/102; G05D 1/652
See application file for complete search history.

(56) References Cited

U.S. PATENT DOCUMENTS 2,825,514 A 3/1958 Johann
2,940,691 A 6/1960 David
(Continued)

FOREIGN PATENT DOCUMENTS

AU 2017200817 A1 8/2017
AU 2016238069 C1 6/2019
(Continued)

OTHER PUBLICATIONS

U.S. Appl. No. 17/162,313 , "Final Office Action", Oct. 30, 2024, 20 pages.

(Continued)

*Primary Examiner* — Donald J Wallace
*Assistant Examiner* — Jalal C Coduroglu
(74) *Attorney, Agent, or Firm* — Kilpatrick Townsend & Stockton LLP

(57) ABSTRACT

Embodiments provide an electric aircraft with a plurality of lift fan assemblies that are configured to provide vertical lift, and one or more pusher propellers that are configured to provide forward thrust. The lift fan assemblies may be coupled to the wings of the aircraft via one or more support structures, and the wings may be coupled to an upper region of the fuselage. The pusher propeller(s) may be coupled to a tailing end of the fuselage. The lift fan assemblies and the pusher propeller(s) may provide thrust and movement in directions that are orthogonal to one another. A control system coupled to the aircraft may control the lift fan assemblies and the one or more pusher propellers to activate, increase in power, and decrease in power. The lift fan assemblies and the one or more pusher propellers may be operated separately, and may be active at different times.

20 Claims, 4 Drawing Sheets

Related U.S. Application Data

(60) Provisional application No. 62/972,528, filed on Feb. 10, 2020.

(51) Int. Cl.

| | |
|---|---|
| *B64C 5/02* | (2006.01) |
| *B64C 11/00* | (2006.01) |
| *B64C 27/32* | (2006.01) |
| *B64D 27/24* | (2024.01) |
| *G05D 1/00* | (2024.01) |
| *G05D 1/652* | (2024.01) |

(52) U.S. Cl.
CPC ............. *B64C 11/00* (2013.01); *B64C 27/32* (2013.01); *B64D 27/24* (2013.01); *G05D 1/102* (2013.01); *G05D 1/652* (2024.01); *B60L 2200/10* (2013.01)

(56) References Cited

U.S. PATENT DOCUMENTS

| | | | |
|---|---|---|---|
| 3,059,876 | A | 10/1962 | Platt |
| 3,081,964 | A | 3/1963 | Quenzler |
| 3,089,666 | A | 5/1963 | Quenzler |
| 3,161,374 | A | 12/1964 | Allred et al. |
| 4,828,203 | A * | 5/1989 | Clifton ................ B64C 29/0033 |
| | | | 244/12.3 |
| 5,823,468 | A | 10/1998 | Bothe |
| 5,890,441 | A * | 4/1999 | Swinson ................ B64U 10/13 |
| | | | 244/12.3 |
| 6,184,656 | B1 | 2/2001 | Karunasiri et al. |
| 6,457,672 | B1 | 10/2002 | Tai |
| 6,655,631 | B2 | 12/2003 | Austen-Brown |
| 7,874,513 | B1 | 1/2011 | Smith |
| 8,123,460 | B2 | 2/2012 | Collette |
| 8,471,529 | B2 | 6/2013 | Vance et al. |
| 8,485,464 | B2 | 7/2013 | Kroo |
| 8,707,721 | B2 | 4/2014 | Scherer et al. |
| 8,733,690 | B2 | 5/2014 | Bevirt et al. |
| 8,829,742 | B2 | 9/2014 | Wu et al. |
| 9,160,264 | B2 | 10/2015 | Hu |
| 9,172,120 | B2 | 10/2015 | Pariseau et al. |
| 9,266,607 | B2 | 2/2016 | Fink et al. |
| 9,321,368 | B2 | 4/2016 | Yang et al. |
| 9,437,850 | B2 | 9/2016 | Brockman et al. |
| 9,567,088 | B2 | 2/2017 | Godlasky et al. |
| 9,673,431 | B2 | 6/2017 | Despesse |
| 9,705,438 | B2 | 7/2017 | Zhao et al. |
| 9,764,833 | B1 | 9/2017 | Tighe et al. |
| 9,783,288 | B1 | 10/2017 | Moore et al. |
| 9,789,782 | B2 | 10/2017 | Holgers et al. |
| 9,840,161 | B2 | 12/2017 | Chikkannanavar et al. |
| 9,960,458 | B2 | 5/2018 | Weicker et al. |
| 10,029,785 | B2 | 7/2018 | Niedzballa |
| 10,040,363 | B2 | 8/2018 | Beaston et al. |
| 10,056,767 | B2 | 8/2018 | Troberg et al. |
| 10,110,033 | B1 | 10/2018 | Hom et al. |
| 10,118,695 | B2 | 11/2018 | Thomassin et al. |
| 10,124,890 | B2 | 11/2018 | Sada-Salinas et al. |
| 10,138,899 | B2 | 11/2018 | Joubert et al. |
| 10,144,507 | B2 | 12/2018 | Chretien |
| 10,162,367 | B2 | 12/2018 | Douglas et al. |
| 10,298,026 | B2 | 5/2019 | Trimboli et al. |
| 10,322,814 | B1 | 6/2019 | Tian |
| 10,472,058 | B2 | 11/2019 | Tian |
| 10,518,875 | B2 | 12/2019 | Judas et al. |
| 10,526,083 | B2 | 1/2020 | Shaw |
| 10,559,861 | B2 | 2/2020 | Zheng et al. |
| 10,608,505 | B1 | 3/2020 | Long et al. |
| 10,625,870 | B1 | 4/2020 | Melack et al. |
| 10,649,468 | B2 | 5/2020 | Cutler et al. |
| 10,870,485 | B2 | 12/2020 | Reichert et al. |
| 10,914,789 | B2 | 2/2021 | Lemkin et al. |
| 11,072,423 | B1 * | 7/2021 | Robertson ............... B64C 21/08 |
| 11,643,200 | B2 | 5/2023 | Lee et al. |
| 12,006,033 | B1 | 6/2024 | Villa et al. |
| 2003/0094537 | A1 | 5/2003 | Austen-Brown |
| 2004/0107013 | A1 | 6/2004 | Fuller et al. |
| 2007/0057113 | A1 | 3/2007 | Parks |
| 2007/0158494 | A1 * | 7/2007 | Burrage ................. B64C 39/04 |
| | | | 244/7 R |
| 2009/0251100 | A1 | 10/2009 | Incledon et al. |
| 2009/0286149 | A1 | 11/2009 | Ci et al. |
| 2010/0001120 | A1 * | 1/2010 | Sun ......................... B64C 27/10 |
| | | | 244/6 |
| 2010/0136390 | A1 | 6/2010 | Ueda et al. |
| 2010/0301168 | A1 * | 12/2010 | Raposo .................. B64C 27/82 |
| | | | 244/171.2 |
| 2011/0036938 | A1 | 2/2011 | Blomeley |
| 2011/0315809 | A1 * | 12/2011 | Oliver .................... B64C 39/08 |
| | | | 244/12.4 |
| 2012/0261523 | A1 | 10/2012 | Shaw |
| 2013/0020429 | A1 | 1/2013 | Kroo |
| 2013/0026305 | A1 | 1/2013 | Wang |
| 2013/0069594 | A1 | 3/2013 | Jung |
| 2013/0126680 | A1 | 5/2013 | Hamke et al. |
| 2013/0311008 | A1 | 11/2013 | Kroo |
| 2014/0125284 | A1 | 5/2014 | Qahouq |
| 2015/0136897 | A1 | 5/2015 | Seibel et al. |
| 2015/0175260 | A1 | 6/2015 | Hesselbarth |
| 2015/0344134 | A1 * | 12/2015 | Cruz Ayoroa ...... B64C 29/0033 |
| | | | 244/48 |
| 2016/0023527 | A1 | 1/2016 | Dietrich |
| 2016/0031555 | A1 | 2/2016 | Bevirt et al. |
| 2016/0031556 | A1 | 2/2016 | Bevirt et al. |
| 2016/0115864 | A1 | 4/2016 | Campbell et al. |
| 2016/0134160 | A1 | 5/2016 | Schultz et al. |
| 2016/0207625 | A1 | 7/2016 | Judas et al. |
| 2016/0241058 | A1 | 8/2016 | Carralero et al. |
| 2016/0244158 | A1 | 8/2016 | Fredericks et al. |
| 2016/0297520 | A1 | 10/2016 | Sada-Salinas et al. |
| 2016/0336623 | A1 | 11/2016 | Nayar et al. |
| 2016/0340035 | A1 | 11/2016 | Duru |
| 2017/0301907 | A1 | 10/2017 | Park et al. |
| 2018/0043789 | A1 | 2/2018 | Goetz |
| 2018/0086448 | A1 | 3/2018 | Kroo et al. |
| 2018/0105267 | A1 | 4/2018 | Tighe et al. |
| 2018/0105268 | A1 * | 4/2018 | Tighe .................... B64U 10/10 |
| 2018/0105279 | A1 | 4/2018 | Tighe et al. |
| 2018/0215464 | A1 | 8/2018 | Vetter et al. |
| 2018/0215465 | A1 | 8/2018 | Renteria |
| 2018/0346108 | A1 | 12/2018 | Sheng et al. |
| 2018/0362154 | A1 | 12/2018 | Louis et al. |
| 2018/0370629 | A1 | 12/2018 | Finlay et al. |
| 2019/0009895 | A1 | 1/2019 | Tu |
| 2019/0033890 | A1 | 1/2019 | Douglas et al. |
| 2019/0061901 | A1 | 2/2019 | Long |
| 2019/0092461 | A1 | 3/2019 | Duffy et al. |
| 2019/0100313 | A1 | 4/2019 | Campbell |
| 2019/0127056 | A1 | 5/2019 | Weekes et al. |
| 2019/0135424 | A1 | 5/2019 | Baity et al. |
| 2019/0135425 | A1 | 5/2019 | Moore et al. |
| 2019/0256194 | A1 | 8/2019 | Vander Lind et al. |
| 2019/0291862 | A1 | 9/2019 | Lyasoff et al. |
| 2019/0329882 | A1 | 10/2019 | Baity et al. |
| 2020/0140079 | A1 | 5/2020 | Campbell |
| 2020/0164972 | A1 | 5/2020 | Kiesewetter et al. |
| 2020/0164974 | A1 * | 5/2020 | Parks .................. B64C 29/0083 |
| 2020/0239134 | A1 | 7/2020 | Robertson et al. |
| 2020/0269975 | A1 | 8/2020 | Axel et al. |
| 2020/0290742 | A1 | 9/2020 | Kumar et al. |
| 2020/0354049 | A1 | 11/2020 | Noppel et al. |
| 2020/0391862 | A1 | 12/2020 | Groninga et al. |
| 2020/0407060 | A1 * | 12/2020 | Hosseini ................. B64C 13/38 |
| 2021/0016877 | A1 | 1/2021 | Hohenthal |
| 2021/0031910 | A1 | 2/2021 | Cornes |
| 2021/0094685 | A1 * | 4/2021 | Klemen ................. B64D 33/04 |
| 2021/0107620 | A1 | 4/2021 | Weekes et al. |
| 2021/0107667 | A1 | 4/2021 | Sinha et al. |
| 2021/0206487 | A1 | 7/2021 | Iqbal et al. |

(56) References Cited

U.S. PATENT DOCUMENTS

| | | | |
|---|---|---|---|
| 2021/0253234 A1 | 8/2021 | Tao et al. | |
| 2022/0009626 A1* | 1/2022 | Baharav | B64C 29/0025 |
| 2024/0308655 A1 | 9/2024 | Villa et al. | |

FOREIGN PATENT DOCUMENTS

| | | |
|---|---|---|
| CN | 103796917 A | 5/2014 |
| CN | 105480416 A | 4/2016 |
| CN | 106573678 A | 4/2017 |
| CN | 106864747 A | 6/2017 |
| CN | 108860582 A | 11/2018 |
| CN | 109263934 A | 1/2019 |
| CN | 109720564 A | 5/2019 |
| CN | 109969392 A | 7/2019 |
| CN | 110035954 A | 7/2019 |
| CN | 110450948 A | 11/2019 |
| DE | 102014000509 A1 | 7/2015 |
| DE | 102017118965 A1 | 2/2019 |
| EP | 3251882 B1 | 4/2019 |
| EP | 3466812 A1 | 4/2019 |
| EP | 3597528 A1 | 1/2020 |
| GB | 2545700 A | 6/2017 |
| JP | 2017507843 A | 3/2017 |
| JP | 2017159888 A | 9/2017 |
| KR | 102179828 B1 | 11/2020 |
| WO | 2015143093 A2 | 9/2015 |
| WO | 2017109500 A1 | 6/2017 |
| WO | 2018064209 A1 | 4/2018 |
| WO | 2018130020 A1 | 7/2018 |
| WO | 2019034765 A1 | 2/2019 |
| WO | 2019202325 A1 | 10/2019 |
| WO | 2019211875 A1 | 11/2019 |
| WO | 2020058706 A1 | 3/2020 |

OTHER PUBLICATIONS

AEP6001442/2022 , "Office Action", Oct. 10, 2024, 10 pages.

IL1066433 , "Office Action", Oct. 31, 2024, 5 pages.

JP2022-548457 , "Office Action", Oct. 2, 2024, 3 pages.

PH1-2022-551859 , "Notice of Allowance", Oct. 10, 2024.

CA3,167,783 , "Office Action", Aug. 13, 2024, 4 pages.

"35MW/11MWH ESS Project in Western Australia", Kokam by SolarEdge, 16 pages.

"A Year Gone By. 365 Days of Endless Traffic", Case 3:21-cv-02450-WHO, Document 58-41, Available Online at https://wisk.aero/news/blog/365-days/, Dec. 27, 2018, 6 pages.

"Archer Aviation Inc's Invalidity Contentions", Case No. 3:21-CV-02450-WHO, Oct. 11, 2021, 42 pages.

"Arcturus Complete VTOL C4ISR Solution", Jump, Arcturus UAV, Aug. 11, 2017, 2 pages.

"AW609 Tiltrotor", Leonardo Helicopters Division, 2021, 5 pages.

"Battery Charger Multi XS 25000, XS 25000 Multi XT 14000, XT 14000", CTEK, Available Online at: https://docs.rs-online.com/15d2/0900766b81335f57.pdf, Feb. 27, 2020, 8 pages.

"Bell Boeing V-22 Osprey: One Aircraft—Multiple Missions", A New Era in Vertical Flight, 2017, 2 pages.

"Li-Ion BMS Cell-Board Processor", Lithiumate EL01, Oct. 20, 2011, 14 pages.

"Li-Ion BMS Controller Processor", Lithiumate EL02, Oct. 20, 2011, 9 pages.

"Lithium Ion Battery Monitoring System", Analog Devices AD7280A, 2011, 48 pages.

"Lithium Power BMS Manual", GTBMS005A-MC8, Harbin Guantuo Power Equipment Co., Ltd., Jul. 22, 2009, 12 pages.

"Minimum Operational Performance Standards for Rechargeable Lithium Batteries and Battery Systems", RTCA Inc., Dec. 19, 2017, 94 pages.

"Minimum Operational Performance Standards for Rechargeable Lithium Battery Systems", RTCA Inc., Mar. 13, 2008, 70 pages.

"Owner's Guide : RXV Elite Freedom", EZGO: A Textron Company, 2017, 60 pages.

"Pipistrel Alpha Electro Information Pack", Pipisrel, Revision 05, Oct. 2017, pp. 1-23.

"Strings, Parallel Cells, and Parallel Strings", OrionBMS, Available Online at: https://www.orionbms.com/manuals/pdf/parallel_strings.pdf, pp. 1-17.

"This Week@ NASA", NASA TV, Jun. 17, 2016, 2 pages.

"U-Changer XP Rev 2 User Manual", Valence—Advanced Energy Systems, Document Version 4.8, Nov. 2011, 61 pages.

"Vahana, the Self-Piloted, eVTOL Aircraft from A3 by Airbus, Successfully Completes First FullScale Test Flight", Airbus, Feb. 2, 2018, 3 pages.

"WattsUP, the New 2-Seat Electric Trainer", Pipistrel Aircraft—News, Available Online at: http://www.pipistrel.si/news/wattsup-the-new-2seat-electric-trainer-took, 2 pages.

"X-57 Battery System Survives Flight-Condition, Thermal Runaway Testing", Case 3:21-cv-02450-WHO, Document 58-41, Available Online at https://www.nasa.gov/centers/armstrong/feature/X-57_battery_major_milestone.html, Dec. 13, 2017, 3 pages.

"XTI Aircraft Tri Fan 600", Electric VTOL News, 11 pages.

"XTI TriFan 665 Flies!", The Electric VTOL News, May 8, 2019, 8 pages.

U.S. Appl. No. 17/162,313 , "Final Office Action", Mar. 2, 2023, 24 pages.

U.S. Appl. No. 17/162,313 , "Non-Final Office Action", Sep. 9, 2022, 25 pages.

U.S. Appl. No. 17/173,133 , "Corrected Notice of Allowability", Jan. 26, 2024, 9 pages.

U.S. Appl. No. 17/173,133 , "Final Office Action", Aug. 17, 2023, 35 pages.

U.S. Appl. No. 17/173,133 , "Non-Final Office Action", Mar. 15, 2023, 31 pages.

U.S. Appl. No. 17/173,133 , "Notice of Allowance", Jan. 9, 2024, 12 pages.

Andrea , "Battery Management Systems for Large Lithium-Ion Battery Packs", Artech House, Sep. 30, 2010, 303 pages.

Bertorelli , "Airbus Announces Electric Aircraft", Avweb, Apr. 26, 2014, 1 page.

Bodson et al., "Control Allocation with Load Balancing", American Institute of Aeronautics and Astronautics, Aug. 10-13, 2009, pp. 1-13.

Bordignon , "Constrained Control Allocation for Systems with Redundant Control Effectors", Virginia Polytechnic Institute and State University ProQuest Dissertations Publishing, Dec. 19, 1996, 260 pages.

CA3167783 , "Office Action", Sep. 27, 2023, 5 pages.

CA3169650 , "Office Action", Oct. 11, 2023, 4 pages.

Chin et al., "Battery Evaluation Profiles for X-57 and Future Urban Electric Aircraft", American Institute of Aeronautics and Astronautics/Institute of Electrical and Electronics Engineers Electric Aircraft Technologies Symposium, Aug. 26-28, 2020, pp. 1-12.

Chin et al., "Battery Performance Modeling on Maxwell X-57", American Institute of Aeronautics and Astronautics, Jan. 6, 2019, pp. 1-15.

Clarke et al., "X-57 Power and Command System Design", Institute of Electrical and Electronics Engineers Transportation Electrification Conference and Expo, Jun. 22-24, 2017, 8 pages.

Cobb , "Four-Seat Sun Flyer in the Works", The Aircraft Owners and Pilots Association, Jul. 23, 2017, 3 pages.

De et al., "Low Inductance Axial Flux BLDC Motor Drive for More Electric Aircraft", 2011 Aerospace Conference, 2011, pp. 1-11.

Delong et al., "AS 15531/MIL-STD-1553B Digital Time Division Command/Response Multiplex Data Bus", The Avionics Handbook, 2001, 29 pages.

EP21748185.2 , "Extended European Search Report", Nov. 20, 2023, 8 pages.

EP21779776.0 , "Extended European Search Report", Nov. 29, 2023, 8 pages.

Grady , "Pipistrel Introduces Alpha Electro", Apr. 14, 2015, 1 page.

Harkegard , "Efficient Active Set Algorithms for Solving Constrained Least Squares Problems in Aircraft Control Allocation", Proceedings of the 41st Institute of Electrical and Electronics Engineers Conference on Decision and Control, May 6, 2002, 25 pages.

(56)         References Cited

OTHER PUBLICATIONS

Head , "EPS Aims to Become 'Household Name' in Electric Aviation", eVTOL, Available Online at https://evtol.com/features/eps-powering-electric-aviation-renaissance/, Dec. 5, 2019, 4 pages.

Hsu et al., "Balancing Charge/Discharge Management for Series/Parallel Battery Packs", 7th Institute of Electrical and Electronics Engineers Conference on Industrial Electronics and Applications, Jul. 2012, pp. 613-618.

Huber , "Electric Sun Flyer Plans Fall First Flight", Available Online at: https ://www.ainonline.com/aviation-news/general-aviation/2017-07-26/electric-sun-flyer-plans-fall-first-flight, Jul. 26, 2017, 2 pages.

IDP00202208274 , "Office Action", Feb. 28, 2024, 7 pages.

Ivler et al., "Evaluation of Control Allocation Techniques for a Medium Lift Tilt-Rotor", Presented at the AHS 71st Annual Forum, May 5-7, 2015, pp. 1-20.

Johansen et al., "Control Allocation—A Survey", Department of Engineering Cybernetics, Nov. 2, 2012, 22 pages.

Kahe , "Triple-Triple Redundant Reliable Onboard Computer Based on Multicore Microcontrollers", International Journal of Reliability, Risk and Safety: Theory and Application, vol. 1, No. 1, 2018, pp. 17-24.

Kellermann et al., "Design and Optimization of Ram Air-Based Thermal Management Systems for Hybrid-Electric Aircraft", Aerospace, vol. 8, No. 1, Dec. 2020, pp. 1-21.

Liu et al., "A Fast-Charging Switching-Based Charger With Adaptive Hybrid Duty Cycle Control for Multiple Batteries", Institute of Electrical and Electronics Engineers Transactions on Power Electronics, vol. 32, No. 3, Mar. 2017, pp. 1975-1983.

Mcswain et al., "Greased Lightning (GL-10) Performance Flight Research—Flight Data Report", NASA, Nov. 2017, 79 pages.

Merheb et al., "Active Fault Tolerant Control of Octorotor UAV Using Dynamic Control Allocation", The 2014 International Conference on Intelligent Unmanned Systems, Sep. 2014, 6 pages.

Moore , "The Joby S2 VTOL Concept : Exploring the New Degrees of Design Freedom of Distrusted Electric Propulsion", Vertifile, Nov.-Dec. 2014, pp. 22-24.

Niles , "Pipistrel Flies WATTsUP Electric Trainer", AVweb, Aug. 24, 2014, 1 page.

Oppenheimer et al., "Control Allocation", Chapter 8, Archer-NDCA-00172099, pp. 8-1-8-24.

PCT/US2021/015789 , "International Preliminary Report on Patentability", Aug. 11, 2022, 15 pages.

PCT/US2021/015789 , "International Search Report and Written Opinion", Apr. 29, 2021, 17 pages.

PCT/US2021/017497 , "International Preliminary Report on Patentability", Aug. 25, 2022, 7 pages.

PCT/US2021/017497 , "International Search Report and Written Opinion", Sep. 28, 2021, 8 pages.

Quackenbush et al., "Analysis of Rotor/Airframe Interaction in Hover and Near-Hover Flight Conditions", AIAA SciTech 2019 Forum, Jan. 7-11, 2019, pp. 1-17.

Rapoport , "Airbus Pivots Electric Aircraft Plans", Archer-NDCA-00171664, Apr. 1, 2017, 1 page.

Sasaki et al., "A Statistical Method for Analyzing Lifetime of a Battery Pack", Institute of Electrical and Electronics Engineers Power & Energy Society General Meeting, Jul. 2015, 5 pages.

Schnulo et al., "Further Development of the NASA X-57 Maxwell Mission Planning Tool for Mods II, III, and IV", American Institute of Aeronautics and Astronautics, Aug. 2019, pp. 1-14.

Silva et al., "VTOL Urban Air Mobility Concept Vehicles for Technology Development", Aviation Technology, Integration, and Operations Conference, Jun. 25-29, 2018, pp. 1-16.

Stoll et al., "Conceptual Design of the Joby S2 Electric VTOL PAV", Aviation Technology, Integration, and Operations Conference, Jun. 16-20, 2014, pp. 1-6.

Szondy , "E-Fan Electric Aircraft makes First Public Flight", Archer-NDCA-00171660, Apr. 30, 2014, 4 pages.

Vegh et al., "Current Capabilities and Challenges of NDARC and SUAVE for eVTOL Aircraft Design and Analysis", 2019 AIAA/IEEE Electric Aircraft Technologies Symposium (EATS), Aug. 19-22, 2019, pp. 1-20.

Weeden et al., "Making Better Use of Parallel Battery Strings at Solar Sites by the Inclusion of a Simple Monitoring Module", Institute of Electrical and Electronics Engineers, INTELEC—Twentieth International Telecommunications Energy, Oct. 1998, pp. 204-209.

Yoney , "Pipistrel Taurus Electro G2 takes to the Skies, Goes on Sale", Archer-NDCA-00171840, Feb. 25, 2011, 5 pages.

Young et al., "Simulated Rotor Wake Interactions Resulting from Civil Tiltrotor Aircraft Operations Near Vertiport Terminals", 51st AIAA Aerospace Sciences Meeting including the New Horizons Forum and Aerospace Exposition, Jan. 7-10, 2013, pp. 1-26.

Zhou et al., "Reconfigurable Control Allocation Technology Using Weighted Least Squares for Nonlinear System in Unmanned Aerial Vehicle", Session: IS-4: Intelligent Adaptation and Model Identification, Jun. 25, 2012, pp. 1-11.

CA3,169,650 , "Office Action", Oct. 24, 2024, 3 pages.

U.S. Appl. No. 17/162,313 , Non-Final Office Action, Mailed On Jun. 11, 2025, 25 pages.

U.S. Appl. No. 19/029,720 , "Corrected Notice of Allowability", Jun. 17, 2025, 2 pages.

U.S. Appl. No. 19/030,813 , Non-Final Office Action, Mailed On Jun. 12, 2025, 16 pages.

Application No. EP21748185.2 , Office Action, Mailed On May 13, 2025, 5 pages.

9 Application No. EP21779776.0 , Office Action, Mailed On May 7, 2025, 4 pages.

U.S. Appl. No. 17/162,313 , "Non-Final Office Action", Jul. 8, 2024, 19 pages.

PH1-2022-551859 , "Office Action", Jul. 11, 2024, 7 pages.

U.S. Appl. No. 19/029,720 , "Notice of Allowance", May 23, 2025, 11 pages.

CN202180025808.3 , "Office Action", Mar. 13, 2025, 25 pages.

AU2021214406 , "First Examination Report", Feb. 6, 2025, 4 pages.

AU2021214406 , "Notice of Acceptance", Feb. 24, 2025, 3 pages.

Application No. CN202180027527.1 , Office Action, Mailed On Mar. 13, 2025, 10 pages.

U.S. Appl. No. 17/162,313 , Final Office Action, Mailed On Oct. 8, 2025, 29 pages.

U.S. Appl. No. 19/030,813 , Final Office Action, Mailed On Oct. 8, 2025, 16 pages.

Application No. CN202180025808.3 , Office Action, Mailed On Sep. 12, 2025, 9 pages.

Application No. CN202180027527.1 , Office Action, Mailed On Sep. 12, 2025, 17 pages.

Application No. SG11202251294U , Written Opinion, Mailed On Sep. 11, 2025, 10 pages.

AU2021246913 , "First Examination Report", Oct. 8, 2025, 3 pages.

Application No. BR112022015125-0 , Office Action, Mailed On Oct. 14, 2025, 6 pages.

Application No. IL294867 , Notice of Allowance, Mailed On Oct. 23, 2025, 3 pages.

AU2025200657 , "First Examination Report", Nov. 17, 2025, 4 pages.

Application No. CN202180027527.1 , Office Action, Mailed On Nov. 27, 2025, 18 pages.

Application No. KR10-2022-7029390 , Office Action, Mailed On Oct. 30, 2025, 14 pages.

NZ792012 , "First Examination Report", Dec. 19, 2025, 4 pages.

Application No. JP2024-190013 , Office Action, Mailed On Jan. 8, 2026, 2 pages.

NZ791955 , "First Examination Report", Dec. 23, 2025, 4 pages.

* cited by examiner

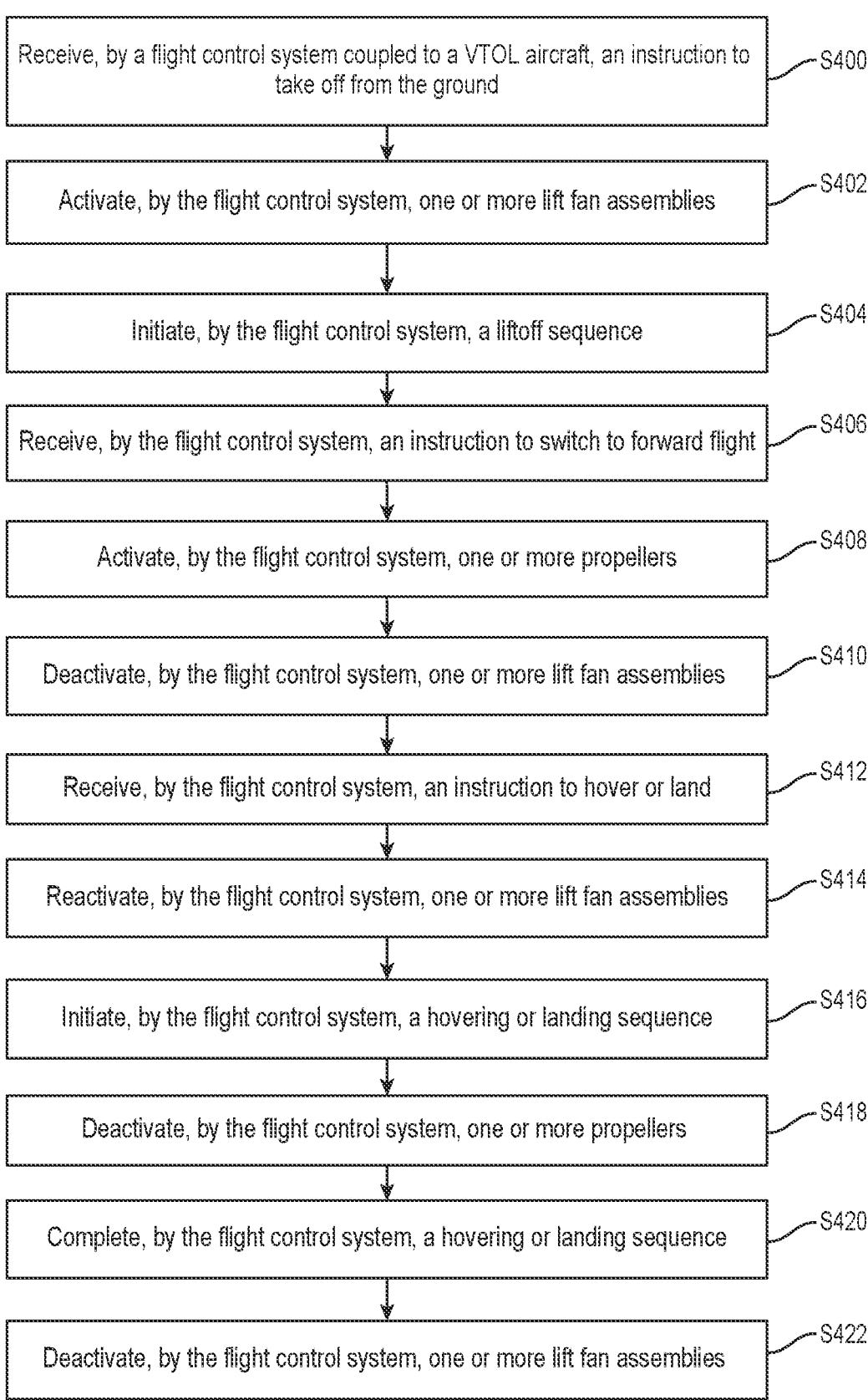

Receive, by a flight control system coupled to a VTOL aircraft, an instruction to take off from the ground ⟋S400

Activate, by the flight control system, one or more lift fan assemblies ⟋S402

Initiate, by the flight control system, a liftoff sequence ⟋S404

Receive, by the flight control system, an instruction to switch to forward flight ⟋S406

Activate, by the flight control system, one or more propellers ⟋S408

Deactivate, by the flight control system, one or more lift fan assemblies ⟋S410

Receive, by the flight control system, an instruction to hover or land ⟋S412

Reactivate, by the flight control system, one or more lift fan assemblies ⟋S414

Initiate, by the flight control system, a hovering or landing sequence ⟋S416

Deactivate, by the flight control system, one or more propellers ⟋S418

Complete, by the flight control system, a hovering or landing sequence ⟋S420

Deactivate, by the flight control system, one or more lift fan assemblies ⟋S422

FIG. 4

AIRCRAFT WITH PUSHER PROPELLER

RELATED APPLICATIONS

This application is a continuation of U.S. patent application Ser. No. 17/173,133 filed Feb. 10, 2021, and entitled "Aircraft with Pusher Propeller," which claims benefit under 35 USC § 119(e) to U.S. Provisional Patent Application No. 62/972,528 filed Feb. 10, 2020, and entitled "Aircraft with Pusher Propeller," the disclosures of which are incorporated by reference herein in their entirety for all purposes.

FIELD

The described embodiments relate generally to an aircraft with vertical takeoff and landing capability. In particular, the embodiments provide an aircraft with a plurality of lift fan assemblies providing vertical thrust in a controlled fashion for lift-off, hover and landing, and one or more pusher propellers for cruise flight.

BACKGROUND

Aircraft with vertical takeoff and landing capability utilize vertically-oriented propulsion for takeoff and landing activities. When airborne, horizontal propulsion is also needed to achieve movement to another location. This may be achieved through sources of propulsion that can tilt or otherwise change orientation. However, these sorts of moving parts can be complicated to engineer and manufacture, and can introduce additional maintenance requirements.

SUMMARY

Various embodiments provide an aircraft configured for vertical takeoff and landing (VTOL). The aircraft comprises a fuselage, a pair of wings coupled to opposite sides of an upper portion of the fuselage in a high-wing configuration, a plurality of lift fan assemblies coupled to the pair of wings, and one or more pusher propellers coupled to the fuselage. The plurality of lift fan assemblies are configured to create a vertical lift. The one or more pusher propellers are configured to create a forward thrust.

The plurality of lift fan assemblies and the one or more pusher propellers can be configured so that the vertical lift is directionally orthogonal to the forward thrust.

Embodiments provide a method performed by a control system coupled to an aircraft configured for vertical takeoff and landing. The control system receives a flight instruction, activates a plurality of lift fan assemblies coupled to the aircraft, that are configured to create a vertical lift for vertical takeoff and landing, controls the plurality of lift fan assemblies to create vertical lift so that the aircraft departs vertically from a stationary position on the ground, activates one or more pusher propellers coupled to the aircraft that are configured to create a forward thrust, controls the one or more pusher propellers to create forward thrust so that the aircraft gains forward velocity after the aircraft departs vertically from the stationary position on the ground, and deactivates or reduces power provided to the plurality of lift fan assemblies after a predetermined amount of forward velocity is gained.

These and other embodiments are described in further detail below.

BRIEF DESCRIPTION OF THE DRAWINGS

FIG. 4 is a flow chart illustrating an exemplary process to control flight of a VTOL aircraft, according to various embodiments.

DETAILED DESCRIPTION

Techniques disclosed herein relate generally to an aircraft with a plurality of lift fan assemblies, and one or more pusher propellers. More specifically, techniques disclosed herein provide an electric VTOL aircraft with a plurality of lift fan assemblies for vertical movement, and one or more pusher propellers provided at a trailing end of the aircraft for forward movement. Various inventive embodiments are described herein.

Figure 1:
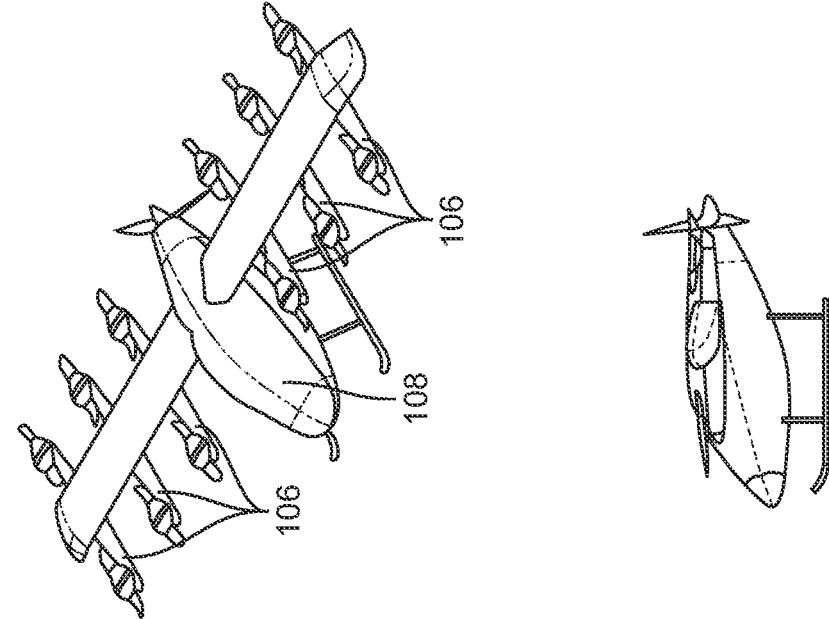
FIG. 1 illustrates top, planar, side and front views (clockwise starting from the top left corner) of a VTOL aircraft with a plurality of lift fan assemblies and one pusher propeller provided at the tailing end of the aircraft, according to various embodiments.
Figure 1:
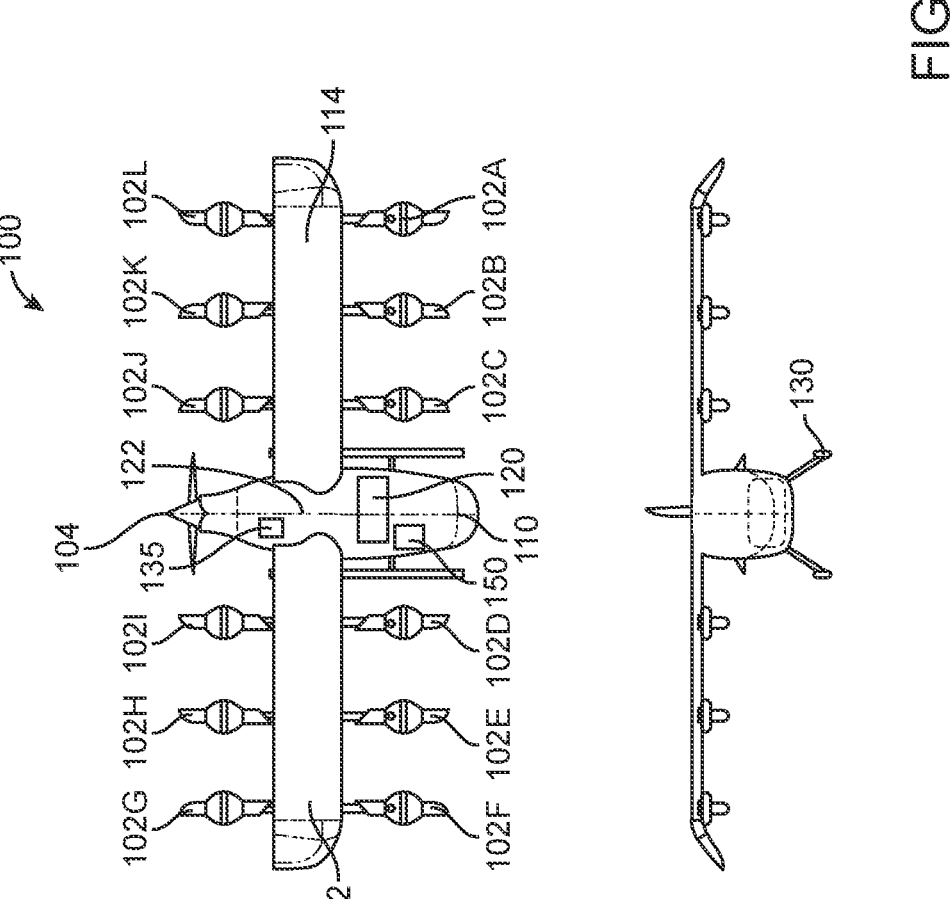

FIG. 1 illustrates top, planar, side and front views (clockwise starting from the top left corner) of a VTOL aircraft 100 with a plurality of lift fan assemblies 102A-L and one pusher propeller 104 provided at the tailing end of the aircraft 100. In the example shown, VTOL aircraft 100 includes a fuselage (body) 108 and a pair of wings 112 and 114. A pusher propeller 104 is provided at the tailing end of the fuselage 108. A set of three underwing support structures 106 (e.g. booms) are provided under each of the pair of wings. Each support structure 106 has two lift fan assemblies 102A-L mounted thereon, one forward of the wing and one aft. Each of the lift fan assemblies 102A-L and the pusher propeller 104 may be driven by an associated drive mechanism, such as a dedicated electric motor. One or more batteries 135 and/or onboard power generators may be used to drive the lift fan assemblies 102A-L and pusher propeller 104, and/or charge/recharge onboard batteries.

In some embodiments, the VTOL aircraft 100 may be configured to carry one or more passengers and/or cargo. In the example shown in FIG. 1, the VTOL aircraft 100 includes a fuselage 108 (e.g., body) which can take various shapes or forms. In some embodiments, the fuselage 108 includes a cabin section 110 for carrying passengers and/or cargo. For example, the cabin section 110 may be provided toward a nose of the VTOL aircraft 100.

The VTOL aircraft 100 can further include landing gear 130. The landing gear 130 can include any suitable combination of one or more skids, wheels, skis, pontoons, shock absorbers, struts, and/or any other suitable component for supporting the VTOL aircraft 100 when landing and/or landed on the ground. In some embodiments, the landing gear 130 can be retractable into a compartment within the fuselage 108.

A pair of wings (e.g., a first wing 112 and a second wing 114) are coupled to opposite sides of the fuselage 108. The pair of wings can take any suitable shape and configuration, according to embodiments.

In some embodiments, the first wing 112 and the second wing 114 may be coupled to the fuselage 108 in a high-wing configuration. That is, the first wing 112 and the second wing 114 may be mounted on an upper portion of the fuselage 108, as shown in FIG. 1.

A high-wing configuration can provide a number of advantages for the VTOL aircraft 100. For example, when the VTOL aircraft 100 is landed, a high-wing configuration can maintain the wings at an elevated position that is above passengers and personnel, allowing for easier access to the fuselage 108 (e.g., for passenger boarding/unboarding and cargo loading/unloading) from various directions. Additionally, the fuselage 108 can be the closest part of the VTOL aircraft 100 to the ground, so that passengers and personnel can access the fuselage 108 without the assistance of portable boarding ramps or stairs. Further, when lift fan assemblies 102A-L are coupled to the pair of wings, a high-wing configuration can place the lift fan assemblies 102A-L above the cabin 110, so that the plane in which the lift fan assembly rotors rotate does not intersect the fuselage and/or a human occupied portion thereof (e.g., for safety reasons). When the VTOL aircraft 100 is landed, a high-wing configuration can keep the lift fan assemblies 102A-L raised high above the ground, and therefore less able to disturb dirt, sand, and other debris.

In other embodiments, the first wing 112 and the second wing 114 may be mounted on a lower portion of the fuselage 108 in a low-wing configuration, or mounted on a middle-height portion of the fuselage 108 in a mid-wing configuration. Lower wing placement can, among other advantages, provide easier access to the wings and lift fan assemblies 102A-L for maintenance.

The first wing 112 and the second wing 114 may take any suitable shape and form. For example, the pair of wings can be rectangular straight wings, tapered straight wings, rounded or elliptical straight wings, swept wings, delta wings, or any other suitable type of wing.

The first wing 112 and the second wing 114 may include any number of features or modifications for improved lift, reduced drag, improved aircraft controllability, improved stability, reduced turbulence, etc. For example, the first wing 112 and the second wing 114 may include curved ends such as winglets, which can be either downward facing winglets or upward facing winglets.

A plurality of lift fan assemblies 102A-L (also known as "lift fans" and "vertical fans") may be coupled to the pair of wings. For example, the VTOL aircraft 100 may include a total of 12 lift fan assemblies (e.g. fans, rotors, propellers) divided equally between the wings. In some embodiments, the lift fan assemblies 102A-L may be coupled directly to the wings. In other embodiments, the lift fan assemblies 102A-L may be mounted on support structures 106, such as booms that may be coupled to an underside of the wings 112, 114.

According to various embodiments, each lift fan assembly 102A-L may be in form of an electric motor-driven rotor (e.g. a combined fan and motor), and may be configured to move the VTOL aircraft 100 in the vertical direction during, for example, take-off, hovering and/or landing, as well as stabilize and control the VTOL aircraft 100.

A rotor may comprise any suitable number of blades (e.g., 2 blades, 3 blades, 4 blades, or 5 blades). The blades may have a predetermined angle of attack. The rotor may further comprise a hub. The blades may be attached to the hub. In some embodiments, the blades and an integral hub may be manufactured as a single piece. The hub provides a central structure to which the blades connect, and in some embodiments is made in a shape that envelops the motor. In some embodiments the motor parts are low-profile so that the entire motor fits within the hub of the rotor, presenting lower resistance to the air flow when flying forward. The rotor can be attached to the rotating part of the motor. The stationary part of the motor can be attached to the support structure 106. In some embodiments the motor can be a permanent magnet motor and can be controlled by an electronic motor controller. The electronic motor controller can send electrical currents to the motor in a precise sequence to allow the rotor to turn at a desired speed or with a desired torque.

According to some embodiments, each wing 112, 114 may include three support structures 106 (e.g. booms). The support structures 106 are shown to be mounted substantially aligned with the horizontal plane of the VTOL aircraft 100 when in level flight. The support structures 106 may be coupled to the undersides of the pair of wings. The support structures 106 can include a forward end extending forward beyond the wing, and an aft end extending aft of the wing.

According to some embodiments, each support structure 106 may include a pair of lift fan assemblies 102A-L mounted thereon. For example, each lift fan assembly may be coupled to an end of a support structure 106 such that a first lift fan assembly 102A is in front of the wing 112 and a second lift fan assembly 102L is aft of the wing 112.

In some embodiments, each of the support structures 106 are identical, and therefore the support structures 106 may be interchangeable between the positions on the wings. For example, a first support structure 106 closer to the fuselage may be interchangeable with an adjacent second support structure 106 (e.g. the middle boom on the wing) or a further third support structure 106 (e.g. the boom furthest away from the fuselage).

In some embodiments, such as in the example shown in FIG. 1, the orientations of the lift fan assemblies 102A-L may be fixed. In other words, the lift fan assemblies 102A-L may be mounted in a fixed position relative to the wings 112, 114 and/or the support structures 106.

While it may be possible to utilize lift fan assemblies 102A-L and/or support structures 106 that can change angles and thrust direction, it can be beneficial to utilize fixed lift fan assemblies 102A-L and support structures 106 in order to simplify the system, reduce possible failure points, and reduce maintenance concerns.

According to some embodiments, the lift fan assemblies 102A-L may be arranged and configured so that they provide thrust directly upward (e.g., in the z-direction) relative to the VTOL aircraft 100, thereby by creating vertical lift for the VTOL aircraft 100. Vertical can be defined as the upward direction when the VTOL aircraft 100 is landed on the ground, or in a stable hover. The lift fan assemblies 102A-L can provide enough thrust to lift the VTOL aircraft 100 off the ground and maintain control, for example during takeoff, hovering and/or landing.

Vertical thrust can be achieved by installing the lift fan assemblies 102A-L and/or support structures 106 so that the rotor blades rotate within a horizontal plane (e.g., a plane defined by the x and y axes) and about the vertical axis (e.g., the aircraft's z-axis). In some embodiments, the lift fan assemblies 102A-L may be configured so that all of the rotor blades rotate within the same plane. In other embodiments, the lift fan assemblies 102A-L may be configured so that all of the rotor blades rotate within different parallel planes.

In other embodiments, some or all of the lift fan assemblies 102A-L may have an angle. Angled lift fan assemblies 102A-L can still, in combination, provide a net thrust that is directly vertical. For example, a partially non-vertical thrust provided by angled lift fan assembly on the first wing 112 can be counteracted by an equal and opposite partially non-vertical thrust provided by lift fan assembly angled in the opposite direction on the second wing 114.

In some embodiments, two adjacent lift fan assemblies (e.g. 102A and 102L) may have their blades mounted with opposite angles of attack such that the two adjacent fan assemblies spin in opposite directions. The two adjacent lift fan assemblies may be coupled to opposite ends of the same support structure 104 (e.g. 102A and 102L). Alternatively, the two adjacent lift fan assemblies may be on different support structures but on the same wing (e.g. 102A and 102B), or on opposite wings (e.g. 102A and 102F). According to various embodiments, a first subset of the lift fan assemblies 102A-L may spin in a first direction, and a second subset (e.g. remainder) of the lift fan assemblies 102A-L may spin in a second direction, opposite to the first direction.

Configuring the lift fan assemblies 102A-L so that some spin in a first direction and other spin in an opposite second direction can advantageously cancel out any angular momentum created by the spinning blades so that the VTOL aircraft 100 can hover in a stable manner without rotating.

Further, rotational movement about the vertical axis of the VTOL aircraft 100 (e.g., yaw) can be performed when desired by temporarily reducing the spin rotational rate of some or all a first subset of the lift fan assemblies 102A-L spinning in a first direction, and/or by temporarily increasing the spin rotational rate of a second subset of the lift fan assemblies 102A-L spinning in a second direction so that the total angular momentum created by the spinning blades does not cancel out. Accordingly, the VTOL aircraft 100 can rotate with the use of lift fan assemblies 102A-L (which may all rotate within the same plane or parallel planes) without needing another source of thrust oriented in another direction.

The pusher propeller 104 can be configured to provide thrust to push the VTOL aircraft 100 in the forward direction (e.g., x axis) for forward flight, climb, descent, and cruise. Forward or horizontal thrust (e.g., along the aircraft's x-axis) can be achieved by installing the pusher propeller 104 on the VTOL aircraft 100 so that the propeller blades rotate within a vertical plane (e.g., a plane defined by the z and y axes) and about a horizontal axis (e.g., the x-axis). The pusher propeller 104 is provided on a tailing end of the aircraft 100, behind the pair of wings. According to various embodiments, the pusher propeller 104 remains in a stationary position with respect to the VTOL aircraft 100 (e.g. while the blades of the pusher propeller 104 rotate when activated, the pusher propeller itself cannot be rotated with respect to the VTOL aircraft 100).

The pusher propeller 104 may be in form of an electric motor-driven rotor (e.g. a combined fan and motor). The rotor may comprise any suitable number of blades (e.g., 2 blades, 3 blades, 4 blades, or 5 blades). The blades may have a predetermined angle of attack. The rotor may further comprise a hub. The blades may be attached to the hub. In some embodiments, the blades and an integral hub may be manufactured as a single piece. The hub provides a central structure to which the blades connect, and in some embodiments is made in a shape that envelops the motor. In some embodiments the motor parts are low-profile so that the entire motor fits within the hub of the rotor, presenting lower resistance to the air flow when flying forward. The rotor can be attached to the rotating part of the motor. In some embodiments the motor can be a permanent magnet motor and can be controlled by an electronic motor controller. The electronic motor controller can send electrical currents to the motor in a precise sequence to allow the rotor to turn at a desired speed or with a desired torque.

A combination of the pusher propeller 104 and wings 112, 114 may achieve both forward movement and lift. Accordingly, once the VTOL aircraft 100 reaches a sufficient speed (e.g. predetermined amount of speed) so that the wings provide lift, the lift fan assemblies 102A-L may no longer be needed to provide lift. At this point the lift fan assemblies 102A-L may temporarily stop operating. For example, the lift fan assemblies 102A-L may initially be active and provide thrust to lift the VTOL aircraft 100. Once the VTOL aircraft 100 is off the ground and/or at a certain height, the pusher propeller 104 can activate and/or increase the horizontal thrust so that the VTOL aircraft 100 gains horizontal velocity. The lift fan assemblies 102A-L may continue providing vertical lift while horizontal velocity increases, as the wings may not provide sufficient vertical lift until a predetermined speed is achieved. The lift fan assemblies 102A-L may eventually (or gradually) reduce their vertical thrust contribution as the wings 112, 114 gradually provide more (e.g. an increasing amount of) vertical lift during the increasing horizontal velocity.

In some embodiments, it may be more efficient utilize the pusher propeller 104 and wings 112, 114 to achieve vertical lift, instead of the lift fan assemblies 102A-L, when the VTOL aircraft 100 is at the predetermined speed.

According to various embodiments, the lift fan assemblies 102A-L may stop operating at any suitable time. For example the lift fan assemblies 102A-L may stop operating when the pusher propeller 104 is active. According to various embodiments, the pusher propeller 104 and at least a subset of the lift fan assemblies 102A-L may be operational at the same time or at least at some times. For example, the lift fan assemblies 102A-L may continue operating during an initial period of forward thrust provided by the pusher propeller 104, and then the lift fan assemblies 102A-L may stop operating when the VTOL aircraft 100 has achieved cruising speed and is in a state of forward flight.

According to some embodiments, the pusher propeller 104 may be oriented substantially orthogonally with respect to the lift fan assemblies 102A-L. As a result, the pusher propeller 104 and the lift fan assemblies 102A-L may be configured to provide thrust in orthogonal directions (e.g., vertical thrust from the lift fan assemblies 102A-L and horizontal thrust from the pusher propeller 104). Isolating the directional thrusts into two separate types of components can beneficially simplify the control and design of the VTOL aircraft 100 (e.g., in contrast with an aircraft that utilizes tilting fans). In some embodiments, the pusher propeller 104 and the lift fan assemblies 102A-L can be operated, powered on, and otherwise controlled independently from one another, thereby allowing thrust to be applied independently in the orthogonal directions (e.g., thrust can be applied in the different directions at the same time and at different times).

In the example shown in FIG. 1, the pusher propeller 104 is positioned and mounted on the aft end of the fuselage 108. The central location of the pusher propeller 104 can enable horizontal thrust to the VTOL aircraft 100 without applying undesirable rotational forces. Additionally, positioning the pusher propeller 104 at the back of the fuselage 108 can maximize the distance from a cabin 110 positioned toward the front of the fuselage 108, thereby reducing propeller noise experienced by passengers in the cabin 110. Also, the rotational plane of the pusher propeller blades does not intersect the fuselage 108 or cabin 110, so any reflected debris is unlikely to cause damage to the VTOL aircraft 100 or injury/damage to passengers/cargo.

According to some embodiments, the pusher propeller 104 may be coupled in a fixed orientation to the tailing end of the fuselage 108. For example, the pusher propeller 104 can remain in a stationary position with respect to the VTOL aircraft 100 (e.g. while the blades of the pusher propeller 104 rotate when activated, the pusher propeller itself cannot be rotated with respect to the VTOL aircraft 100). Both the pusher propeller 104 and the lift fan assemblies 102A-L may have fixed orientations, and thereby may always be configured to provide thrust in orthogonal directions.

In some embodiments, the pusher propeller 104 can be located in other areas. For example, the pusher propeller 104 can be mounted on the nose of the fuselage 108 or on top of the fuselage 108. Also, embodiments allow for additional pusher propellers to be included. For example, in addition to or instead of the pusher propeller 104, two pusher propellers can be coupled to the wings. A first pusher propeller can be mounted on the first wing 112 (e.g., on the top, bottom, or edge of the wing), and a second pusher propeller can be mounted on the second wing 114 (e.g., on the top, bottom, or edge of the wing). Such additional pusher propellers may also have fixed orientations.

In some embodiments, the pusher propeller 104 may be configured to have the capability of spinning in either direction. As a result, the pusher propeller 104 may be able to spin in the opposite direction so that it provides a reverse horizontal thrust. A reverse horizontal thrust can be useful for moving the VTOL aircraft 100 in a backward direction (e.g., backing out of a hangar area from a hover position). Additionally, a reverse horizontal thrust can be used to reduce forward flight velocity. For example, reverse horizontal thrust from the pusher propeller 104 can be used in instead of, or in addition to, flaps to slow the VTOL aircraft 100 and/or bring the VTOL aircraft 100 to a stationary hover. The lift fan assemblies 102A-L can reactivate and/or increase vertical thrust as the VTOL aircraft 100 slows or returns to a hover position.

According to various embodiments, the VTOL aircraft 100 may include a driveshaft 122 extending along the fuselage 108. The driveshaft 122 may couple the pusher propeller 104 to an engine 120 or battery provided, for example, closer to the leading edge of the aircraft 100.

The VTOL aircraft 100 can include any other suitable control structures and control surfaces. For example, any suitable number of ailerons, rudders, elevators, slats, flaps, spoilers, and/or stabilizers can be included.

According to various embodiments, the VTOL aircraft 100 may be an electrically powered aircraft. One or more battery units 135 may be coupled to the VTOL aircraft 100 to power the lift fan assemblies 102A-L and/or the pusher propeller 104. More specifically, the lift fan assemblies 102A-L and the pusher propeller 104 may be driven by electric motors that are powered by a power system including the one or more battery units 135. In some embodiments, each of the lift fan assemblies 102A-L and the pusher propeller 104 may have a dedicated battery unit 135. Battery units 135 may be provided on support structures 106 carrying the lift fan assemblies 102A-L, within the fuselage, or a combination thereof. Each battery unit 135 may include a plurality of battery cells configured to power the lift fan assemblies 102A-L and the pusher propeller 104. Accordingly, the VTOL aircraft 100 may be an electric aircraft. In alternative embodiments, the VTOL aircraft 100 may be a hybrid-electric aircraft.

According to various embodiments, the VTOL aircraft 100 may be controlled automatically and/or remotely (e.g. may not require an on-board pilot to operate the aircraft, and may be controlled based on a control signal or instruction received from a remote entity).

A control system 150, such as a flight control system, coupled to the aircraft 100 may be configured to control the VTOL aircraft 100. The control system 150 may be configurable to control the VTOL aircraft 100 automatically and/or remotely (e.g. via a control signal received from a remote entity, such as a remote controller, a remote pilot or a remote control tower). In various embodiments, the control system 150 comprises one or more processors configured to perform the processing and control functions described herein.

The control system 150 may control when the lift fan assemblies 102A-L and the pusher propeller 104 should be operated, and/or the amount of power provided to the lift fan assemblies 102A-L and the pusher propeller 104. The control system 150 may be configurable to control the plurality of lift fan assemblies and the one or more pusher propellers independently from one another. According to various embodiments, the control system 150 may control the pusher propeller 104 and the lift fan assemblies 102A-L based on input received from a remote controller (e.g. remote pilot), input received from an autopilot, sensor data and/or flight data received from the sensors (e.g. sensors measuring air temperature, electric motor temperature, airspeed of the aircraft, etc.), computers, and other input/output devices coupled to the aircraft.

Accordingly, the control system 150 may be configured to translate pilot or other operator input, and/or corrections computed by an onboard computer, into forces and moments and/or to further translate such forces and moments into a set of actuator (e.g., lift rotors; propellers; control surfaces, such as ailerons; etc.) and/or associated parameters (e.g., lift fan power, speed, or torque) to provide the required forces and moments. For example, pilot or other operator inputs may indicate a desired change in the aircraft's speed, direction, and/or orientation, and/or wind or other forces may act on the aircraft, requiring the lift fans and/or other actuators to be used to maintain a desired aircraft attitude (roll/pitch/yaw), speed, and/or altitude.

According to various embodiments, the control system 150 may be configurable to receive a flight instruction, such as a takeoff, hover, cruise or landing instruction. The control system 150 may then determine the current location and/or velocity of the VTOL aircraft 100, and then control the operation of the lift fan assemblies 102A-L and the pusher propeller 104 based on the flight instruction. During the operation of the VTOL aircraft 100, the control system 150 may be configurable to continuously monitor the operational states of the lift fan assemblies 102A-L and the pusher propeller 104 in view of the flight instruction.

The number and location of pusher propellers and lift fan assemblies is not limited to that which is illustrated in FIG. 1. The VTOL aircraft 100 can include a greater number of pusher propellers, and a greater or lesser number of lift fan assemblies. For example, according to some embodiments and as described below with respect to FIG. 3, the VTOL aircraft can include two pusher propellers.

The exemplary VTOL aircraft 100 illustrated in FIG. 1 does not include a tail. The control and stabilization provided by a tail may not be mandatory, as the lift fan assemblies may provide control of the VTOL aircraft 100. However, embodiments are not limited as such, and similar propeller configurations may be used in connection with an aircraft that includes tail. Such a tail can take a variety of shapes or forms. For example, according to some embodiments and as described below with respect to FIG. 2, the VTOL aircraft can include a tail, such as a V-tail.

Figure 2:
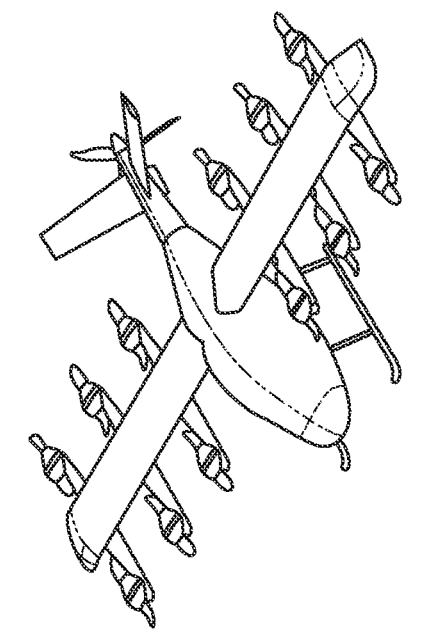
FIG. 2 illustrates top, planar, side and front views (clockwise starting from the top left corner) of a VTOL aircraft with a V-tail and a pusher propeller provided at a tailing end of the aircraft, behind the V-tail, according to various embodiments.
Figure 2:
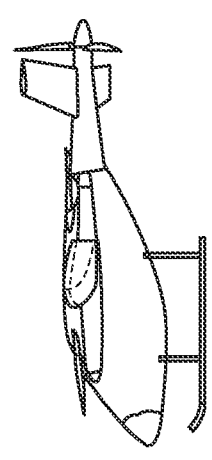
Figure 2:
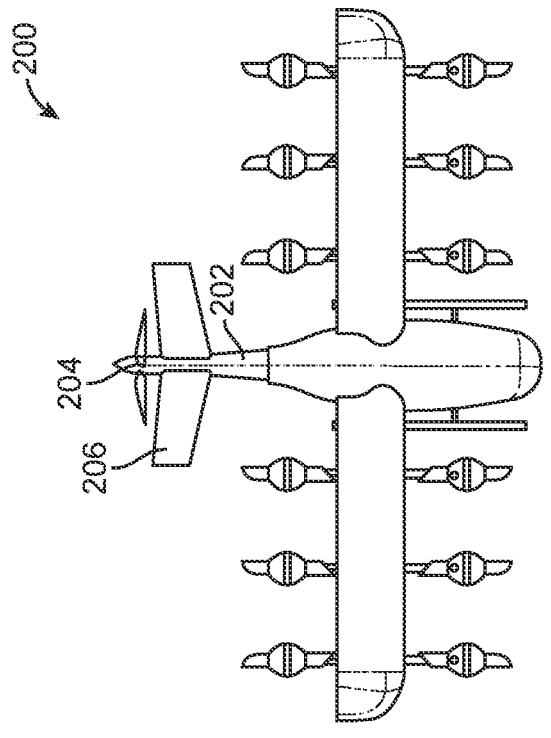
Figure 2:
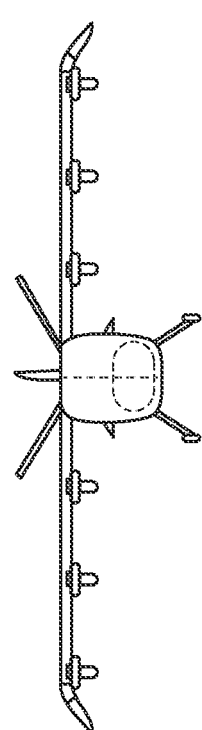

FIG. 2 illustrates another exemplary VTOL aircraft with a horizontal stabilizer. FIG. 2 illustrates top, planar, side and front views (clockwise starting from the top left corner) of the VTOL aircraft 200 with a horizontal stabilizer 206 provided on a tail 202 of the VTOL aircraft 200. The exemplary VTOL aircraft 200 illustrated in FIG. 2 includes a plurality of lift fan assemblies and a pusher propeller 204 provided at a tailing end of the aircraft 200 (on the tail 202 of the aircraft 200), behind the horizontal stabilizer 206. According to some embodiments, the VTOL aircraft 200 can be similar the VTOL aircraft 100 described above with respect to FIG. 1, but with the addition of the tail 202, the horizontal stabilizer 206 and the location of the pusher propeller 204 being behind the horizontal stabilizer 206 and mounted on the tail 202.

The horizontal stabilizer 206 (e.g., a tailplane) can be coupled to a rear end of the fuselage 102, such as on the tail 202. The horizontal stabilizer 206 may be in any suitable shape or form. For example, as shown in FIG. 2, the horizontal stabilizer 206 may be V-shaped, taking the form of a V-tail. A V-tail can include two stabilizer surfaces protruding at an angle from a tail. In some embodiments, each of the stabilizer surfaces can further include hinged control surfaces on the aft edges. Additionally, as shown in FIG. 2, an additional (e.g., third) vertical stabilizer surface can be mounted on the tail, extending vertically downward.

Introducing the horizontal stabilizer 206 can provide additional stability and control of the VTOL aircraft 200. This can be especially useful during times when the lift fan assemblies are disabled or otherwise not being utilized or relied on for control and stability (e.g., during cruising flight).

The pusher propeller 204 can be mounted to the aft of the horizontal stabilizer 206, and can be positioned along a center line of the fuselage. Mounting the pusher propeller 204 behind the horizontal stabilizer 206 can advantageously further distance the pusher propeller 204 from the front end of the VTOL aircraft 200, which can further reduce the propeller noise experienced by passengers in the cabin. Additionally, passenger safety can be improved by increasing the distance between passengers and the pusher propeller 204 during boarding and deboarding activities.

According to some embodiments, the pusher propeller 204 may be coupled in a fixed orientation to the horizontal stabilizer 206. For example, the pusher propeller 204 can remain in a stationary position with respect to the horizontal stabilizer 206 and/or the VTOL aircraft 200 (e.g. while the blades of the pusher propeller 204 rotate when activated, the pusher propeller itself cannot be rotated with respect to the VTOL aircraft 100). Both the pusher propeller 204 and the lift fan assemblies may have fixed orientations, and thereby may always be configured to provide thrust in orthogonal directions.

Figure 3:
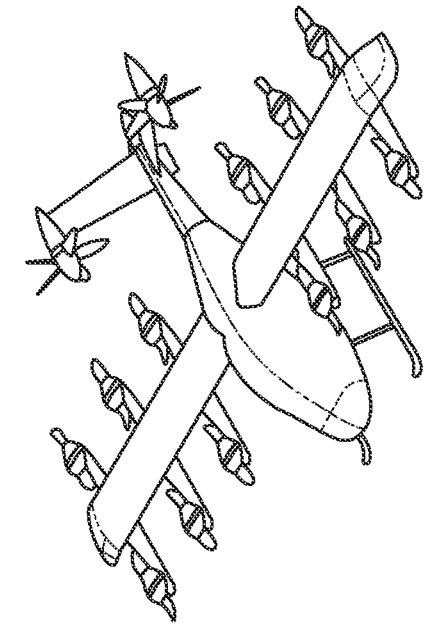
FIG. 3 illustrates top, planar, side and front views (clockwise starting from the top left corner) of a VTOL aircraft a plurality of pusher propellers, according to various embodiments.
Figure 3:
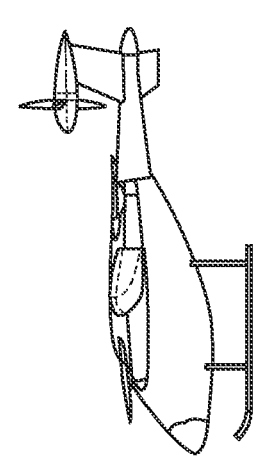
Figure 3:
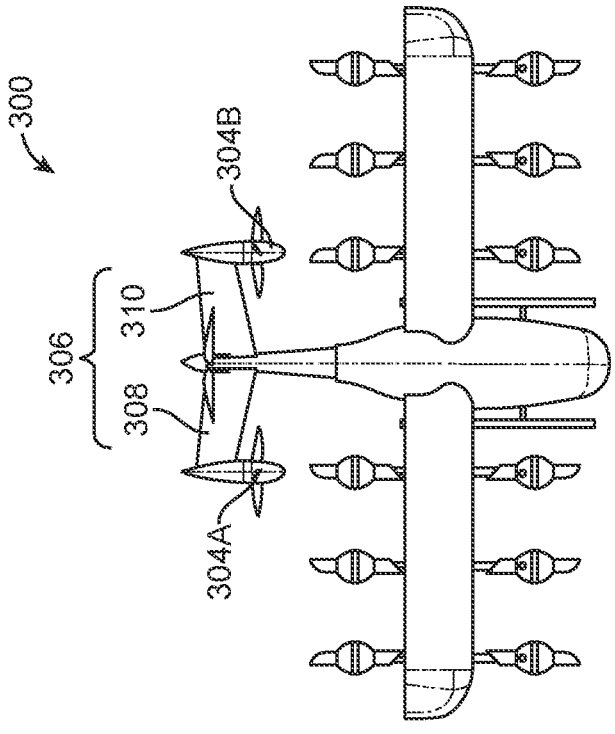
Figure 3:
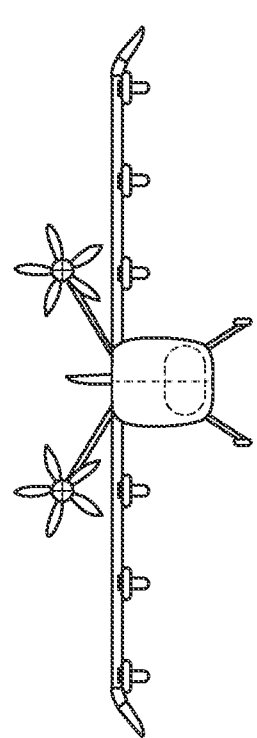

FIG. 3 illustrates another exemplary VTOL aircraft with a plurality of pusher propellers. According to some embodiments, the VTOL aircraft 300 can be similar the VTOL aircraft 100 described above with respect to FIG. 1, but with the addition of a horizontal stabilizer 306 (e.g., similar to the horizontal stabilizer 206 described above with respect to FIG. 2), the inclusion of two pusher propellers 304A-B, and the location of the pusher propellers 304A-B being on the edges of the horizontal stabilizer 306.

FIG. 3 illustrates top, planar, side and front views (clockwise starting from the top left corner) of the VTOL aircraft 300 with two pusher propellers 304A-B, one on the first stabilizer surface 308 of the horizontal stabilizer 306, and the other on the second stabilizer surface 310 of the horizontal stabilizer 306.

According to various embodiments, the pusher propellers 304A and 304B may be coupled to each edges of the stabilizer surfaces 308 and 310, respectively. The stabilizers surfaces 308 and 310 and the pusher propellers 304A and 304B may be positioned symmetrically to each other with respect to a vertical center plane of the aircraft 300.

The pusher propellers 304A and 304B can be mounted so that the propeller blades are positioned in front of the first stabilizer surface 308 and the second stabilizer surface 310, as shown in FIG. 3. This can advantageously improve safety for people (e.g., maintenance personnel or passengers) walking behind the VTOL aircraft 300 when the VTOL aircraft 300 is landed, as the propeller blades may not be exposed on the aft end of the VTOL aircraft 300.

Alternatively, in other embodiments, the propeller blades can be positioned behind the first stabilizer surface 308 and the second stabilizer surface 310. This positioning can increase the distance between the propeller blades and the front of the fuselage, reducing noise at the front of the fuselage and increasing the safety distance between loading passenger and the propeller blades.

According to some embodiments, the pusher propellers 304A and 304B may be coupled in a fixed orientation to the horizontal stabilizer 306. For example, the pusher propellers 304A and 304B can remain in a stationary position with respect to the horizontal stabilizer 306 (e.g. while the blades of the pusher propellers 304A and 304B rotate when activated, the pusher propellers themselves cannot be rotated with respect to the horizontal stabilizer 306). The pusher propellers 304A and 304B and the lift fan assemblies may all have fixed orientations, and thereby may always be configured to provide thrust in orthogonal directions.

It can be advantageous to introduce two pusher propellers 304A and 304B for several reasons. For example, there is redundancy in case one of the two pusher propellers 304A and 304B is damaged or fails. Different amounts of power can be applied to each of the pusher propellers 304A and 304B to provide unequal thrust for maneuvering of the VTOL aircraft 300. Also, the same amount of horizontal thrust can be achieved with a lower rotational rate, since the thrusts of the two pusher propellers 304A and 304B are combined. This can reduce noise, as two pusher propellers 304A and 304B rotating at a lower speed may produce less noise than a single pusher propeller at a higher speed.

Further, placing the pusher propellers 304A and 304B at the edges of a V-tail can raise the position of the pusher propellers 304A and 304B compared as compared to the pusher propellers shown in FIGS. 1-2. A higher position can increase safety, by removing the pusher propellers 304A and 304B from areas where people may walk when the VTOL aircraft 300 is landed. Additionally, the pusher propellers 304A and 304B can be above the plane in which the rotors of the lift fan assemblies rotate. This can reduce the chances of the pusher propellers 304A and 304B being impacted and/or damaged by debris expelled from the lift fan assemblies.

The number and position of the pusher propellers 304A and 304B on the horizontal stabilizer 306 may be modified according to different embodiments. For example, in addition to or instead of the two pusher propellers 304A and 304B shown in FIG. 3, a different pusher propeller can be coupled to the aft end of the tail (e.g., similar to the pusher propellers 204 shown in FIG. 2), and/or other pusher propellers can be included on the wings (e.g., above, below, or at the ends of the wings).

Embodiments advantageously isolate vertical lift components and functions from horizontal thrust components and functions. Lift fan assemblies can provide vertical lift for takeoff, landing, and hovering functions. A pusher propeller can provide forward thrust, and in combination with wings, lift during flight when sufficient velocity is attained. This configuration provides a VTOL aircraft that is functional and has simple, fixed components. Both vertical takeoff and rapid horizontal movement can be performed without needing any tilting or adjusting fans/propellers. This can enable simpler flight control, easier maintenance, and reduce moving parts which can be prone to failure.

Further, embodiments provide redundancy. Vertical lift can be provided by vertical lift fans, as well as wings during forward movement. Additionally, overheating can be avoided, as various components can be disabled at certain times. The vertical lift fan assemblies can stop operating during forward flight, and the pusher propeller can stop operating during hovering, landing, and takeoff.

Embodiments also improve aircraft safety. With high wings, lift fan assemblies near the wings or at the same level as the wings, and a pusher propeller behind the aircraft, the moving rotors are removed from areas where passengers may travel. Additionally, debris that may be reflected from moving rotors is unlikely to impact the fuselage. Also, coupling the lift fan assemblies to high wings can provide space between the lift fan assemblies and the ground, and can thereby reduce the likelihood of ingesting debris from the ground.

FIG. 4 is a flow chart illustrating an exemplary process to control flight of a VTOL aircraft configured for vertical takeoff and landing through a transition between vertical lift and forward flight.

At step S400, the aircraft may be in a stationary position on the ground. For example, the aircraft may be parked at a charging station for charging the batteries. Alternatively, the aircraft may be parked at a location awaiting to receive cargo or passengers. The flight control system of the VTOL aircraft may receive a flight plan (e.g. from the autopilot, a pilot or a remote controller pilot) to arrive at a predetermined destination. The flight plan may include an instruction to takeoff from the ground.

At step S402, the flight control system may control one or more of the lift fan assemblies to activate. For example, the thrust-producing components of the aircraft may be inactive or in a standby mode. The flight control system may power up the lift fan assemblies from an inactive mode so that they are ready to provide vertical lift.

At step S404, the flight control system may initiate a takeoff sequence to lift the aircraft off of the ground. For example, the flight control system may control the lift fan assemblies to provide vertical thrust so that the aircraft leaves the ground. The flight control system may continue operating the lift fan assemblies in this manner until a certain time has passed or a certain height is reached (e.g., a safe distance from a landing pad).

At step S406, after a certain amount of time has passed and/or altitude gained since performing step S404, the flight control system may receive an instruction to transition to forward flight. Before switching to the forward flight mode, the control system may check one or more of the altitude, speed and orientation of the aircraft to ensure that the parameters are within a predetermined, desirable range. In some embodiments, the control system may communicate the parameters to a remote entity (e.g. a remote control tower or a remote pilot).

Upon receiving the flight instruction to transition to forward flight, at step S408, the control system may control one or more of the pusher propellers to activate. The pusher propellers can power on and begin operating, and then can generate forward thrust for the aircraft. The flight control system can control the forward acceleration in any suitable manner. For example, the flight control system may gradually increase the power supplied to the pusher propeller so that the aircraft gradually gains forward velocity.

In some embodiments, the pusher propeller may activate and begin providing forward thrust while the aircraft is still in the process of gaining altitude from the vertical lift fans. As a result, forward travel can overlap with vertical lifting. Additionally, the flight control system can adjust power to the lift fan assemblies as required to maintain stability and altitude while the pusher propeller causes forward airspeed to increase.

At step S410, the flight control system may deactivate the lift fan assemblies, or otherwise reduce power provided to the lift fan assemblies. For example, once the propeller(s) has generated a predetermined velocity so that the wings provide enough lift to maintain altitude, the lift fan assemblies may no longer be needed for vertical lift. Accordingly, the lift fan assemblies can be powered down, deactivated, placed in a standby mode, or be operated at a reduced power level during forward flight of the aircraft.

In some embodiments, the power provided to the lift fan assemblies can gradually decrease in coordination with a gradual gain of forward velocity. For example, as the propeller generates forward speed for the aircraft, the wings may gradually provide more vertical lift. As the wing-provided lift increases, the lift fan assemblies can correspondingly decrease their vertical lift contribution. The lift fan assemblies can gradually power down until they become inactive. In some embodiments, the lift fan assemblies can maintain a low-level of power and activity without shutting down completely. The aircraft can continue in this manner, with the pusher propeller operating the lift fan assemblies not operating (or operating at a low level), for the majority of the flight.

At step S412, the control system may receive an instruction (e.g. from the autopilot, a pilot or a remote entity) to hover or to land. For example, the aircraft may be approaching a destination landing area (e.g., within a predetermined distance).

Upon receiving the instruction to transition to hover or to land, at step S414, the flight control system may control one or more of the lift fan assemblies to reactivate. The lift fan assemblies can power on and begin operating, and then can generate vertical lift for the aircraft.

At step S416, the flight control system may initiate a hovering or landing sequence to hover or land the aircraft on the ground. For example, the flight control system may cause the aircraft's forward velocity to decrease while vertical lift is maintained. This can include a coordinated reduction of pusher propeller power/thrust and an increase in lift fan assembly power/thrust. For example, as the pusher propeller thrust reduces, the aircraft speed will reduce due to drag, and then the wing-provided lift will reduce. As the wing-provided lift gradually decreases, the flight control system can gradually increase power to the lift fan assemblies to create another source of lift. These contributing forces can be controlled so that the aircraft maintains the same altitude while reducing forward velocity, or so that the aircraft begins a controlled vertical descent while reducing forward velocity.

Embodiments allow the pusher propeller to be operated in various ways during a landing sequence. For example, the pusher propeller can gradually power down. Alternatively, the pusher propeller can suddenly power down, and the forward velocity of the aircraft can naturally decrease due to the drag. As another option, the pusher propeller can transition into a reverse thrust mode so that the aircraft's forward velocity is more quickly reduced.

At step S418, the flight control system may deactivate the one or more propellers, or otherwise reduce power provided to the propeller. For example, when the aircraft has arrived at a location where the aircraft is ready to hover or vertically descend (e.g., to a landing pad), the pusher propeller can be powered down, deactivated, placed in a standby mode, or be operated at a reduced power level so that the lift fan assemblies can be used for a controlled descent. In some embodiments, the pusher propeller can maintain some amount of operation and/or thrust for controlling the aircraft's position (e.g., in case of wind disturbances, etc.)

At step S420, the flight control system may complete a landing sequence to land the aircraft on the ground. For example, the flight control system may control the lift fan assemblies to provide a vertical thrust so that the aircraft descends in a controlled manner. The aircraft can come to stationary position on the ground, such as a landing pad and/or charging station.

At step S422, the flight control system may deactivate the lift fan assemblies, or otherwise reduce power provided to the lift fan assemblies. In some embodiments, the lift fan assemblies and/or pusher propellers can be completely powered down so that rotor blades come to rest. In other embodiments, the lift fan assemblies and/or pusher propellers can maintain a low standby power level so that they can be ready for a subsequent flight.

For simplicity, various active and passive circuitry components are not shown in the figures. In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Electronic components of the described embodiments may be specially constructed for the required purposes, or may comprise one or more general-purpose computers selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Additionally, spatially relative terms, such as "front or "back" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "front" surface can then be oriented "back" from other elements or features. The device can be otherwise oriented (e.g., rotated 90 degrees or at other orientations) and the spatially relative descriptors used herein interpreted accordingly.

What is claimed is:

1. An aircraft comprising:

a fuselage;

a pair of wings coupled to opposite sides of an upper portion of the fuselage;

a plurality of lift fan assemblies coupled to the pair of wings, wherein the plurality of lift fan assemblies are configured to create a vertical lift, the plurality of lift fan assemblies including:

a first subset of lift fan assemblies configured to spin in a first direction; and a second subset of lift fan assemblies configured to spin in a second direction that is opposite the first direction; and a control system configured to control the plurality of lift fan assemblies to create rotational movement about a vertical axis of the aircraft while maintaining vertical lift by at least one of:

controlling the first subset of lift fan assemblies to decrease a first spin rotational rate of the first subset of lift fan assemblies; and controlling the second subset of lift fan assemblies to increase a second spin rotational rate of the second subset of lift fan assemblies.

2. The aircraft of claim 1, wherein the first subset of lift fan assemblies are configured to create a first angular momentum in the first direction during operation, the second subset of lift fan assemblies are configured to create a second angular momentum in the second direction during operation, and the first angular momentum cancels out the second angular momentum when the first spin rotational rate matches the second spin rotational rate.

3. The aircraft of claim 1, wherein the first subset of lift fan assemblies are configured to create a first angular momentum in the first direction during operation, the second subset of lift fan assemblies are configured to create a second angular momentum in the second direction during operation, and the second angular momentum is greater than the first angular momentum when the second spin rotational rate is greater than the second spin rotational rate, thereby causing a net angular momentum in the second direction.

4. The aircraft of claim 1, wherein each of the first subset of lift fan assemblies include first rotor blades configured to have a first angle of attack, and each of the second subset of lift fan assemblies include second rotor blades configured to have a second angle of attack that is opposite the first angle of attack.

5. The aircraft of claim 1, further comprising:

one or more pusher propellers coupled to a tail end of the fuselage, wherein the one or more pusher propellers are configured to create a forward thrust.

6. The aircraft of claim 5, wherein the plurality of lift fan assemblies and the one or more pusher propellers are configured so that the vertical lift is directionally orthogonal to the forward thrust, the one or more pusher propellers are configured to create both forward thrust and reverse thrust.

7. The aircraft of claim 5, wherein the control system is further configured to control the plurality of lift fan assemblies and the one or more pusher propellers independently from one another, and to activate or deactivate the plurality of lift fan assemblies or the one or more pusher propellers based on one or more of flight instructions, flight data received from sensors coupled to the aircraft, or a signal received from a remote entity.

8. The aircraft of claim 1, wherein the fuselage includes a cabin configured for passengers or cargo, each of the plurality of lift fan assemblies include rotor blades that are each configured to rotate within a rotational plane that is positioned above the cabin without intersecting the cabin.

9. The aircraft of claim 1, wherein the fuselage includes a cabin configured for passengers or cargo, and further comprising:

a horizontal stabilizer in a form of a V-tail coupled to a rear end of the fuselage, the V-tail including a first stabilizer surface protruding at a first angle and a second stabilizer surface protruding at a second angle opposite the first angle.

10. The aircraft of claim 1, further comprising:

a plurality of support structures coupled to an underside of the pair of wings, each support structure having a forward end extending forward of the pair of wings and an aft end extending aft of the pair of wings, and wherein each of the plurality of support structures are identical and interchangeable between positions on the pair of wings.

11. The aircraft of claim 10, wherein a pair lift fan assemblies among the plurality of lift fan assemblies are coupled to opposite ends of at least one of the plurality of support structures.

12. The aircraft of claim 1, further comprising:

a plurality of battery units each including a plurality of battery cells configured to power at least the plurality of lift fan assemblies, wherein each of the plurality of lift fan assemblies are coupled to a respective dedicated battery unit of the plurality of battery units.

13. The aircraft of claim 1, wherein each of the plurality of lift fan assemblies comprise an electric motor-driven rotor, wherein at least six lift fan assemblies are coupled to each of the pair of wings, and wherein the pair of wings include winglets.

14. A method, comprising:

receiving, by a control system coupled to an aircraft, a flight instruction to takeoff;

activating, by the control system, a plurality of lift fan assemblies coupled to the aircraft, wherein the plurality of lift fan assemblies are configured to create a vertical lift for vertical takeoff and landing;

controlling, by the control system, the plurality of lift fan assemblies to create vertical lift so that the aircraft departs vertically from a stationary position on a ground surface;

controlling, by the control system, the plurality of lift fan assemblies to create rotational movement about a vertical axis of the aircraft while maintaining vertical lift by at least one of:

decreasing a first spin rotational rate of a first subset of the plurality of lift fan assemblies, the first subset spinning in a first direction; and increasing a second spin rotational rate of a second subset of the plurality of lift fan assemblies, the second subset spinning in a second direction; and after a predetermined amount of forward velocity is gained, deactivating or reducing power provided to, by the control system, the plurality of lift fan assemblies.

15. The method of claim 14, comprising:

controlling, by the control system, the plurality of lift fan assemblies to stop creating the rotational movement about the vertical axis of the aircraft while maintaining vertical lift by controlling the first spin rotational rate of the first subset of the plurality of lift fan assemblies to be equal the second spin rotational rate of the second subset of the plurality of lift fan assemblies.

16. The method of claim 14, wherein the first subset of the plurality of lift fan assemblies create a first angular momentum in the first direction during operation, the second subset of the plurality of lift fan assemblies create a second angular momentum in the second direction during operation, and the second angular momentum is greater than the first angular momentum when the second spin rotational rate is greater than the second spin rotational rate, thereby causing a net angular momentum in the second direction.

17. The method of claim 14, wherein each of the first subset of the plurality of lift fan assemblies include first rotor blades configured to have a first angle of attack, and each of the second subset of the plurality of lift fan assemblies include second rotor blades configured to have a second angle of attack that is opposite the first angle of attack.

18. The method of claim 14, comprising:

controlling, by the control system, the plurality of lift fan assemblies to gradually produce a decreasing amount of vertical lift in coordination with a gradual gain of forward velocity.

19. The method of claim 14, comprising:

activating, by the control system, one or more pusher propellers of the aircraft, wherein the one or more pusher propellers are configured to create forward thrust;

controlling, by the control system, the one or more pusher propellers to create a forward thrust so that the aircraft gains forward velocity;

receiving, by the control system, a subsequent flight instruction to hover or land;

reactivating, by the control system, the plurality of lift fan assemblies;

controlling, by the control system, the one or more pusher propellers to produce a decreasing amount of the forward thrust to reduce the forward velocity; and controlling, by the control system, the plurality of lift fan assemblies to gradually produce an increasing amount of vertical lift in coordination with a gradual reduction of forward velocity.

20. The method of claim 19, wherein the control system is configurable to activate or deactivate the plurality of lift fan assemblies or the one or more pusher propellers based on one or more of flight instructions, flight data received from sensors coupled to the aircraft, or a signal received from a remote entity, and further comprising:

in response to arriving at a location above a landing area, deactivating, by the control system, the one or more pusher propellers; and after deactivating the one or more pusher propellers, controlling, by the control system, the plurality of lift fan assemblies to produce vertical lift in a manner that causes the aircraft to descend vertically until arriving at a second stationary position on the ground surface.

* * * * *